July 7, 1936.  E. O. LOEBER  2,046,334
UTENSIL
Filed Feb. 25, 1933   2 Sheets-Sheet 1
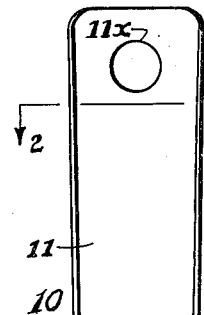
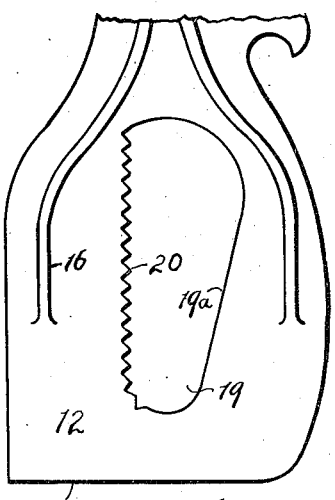
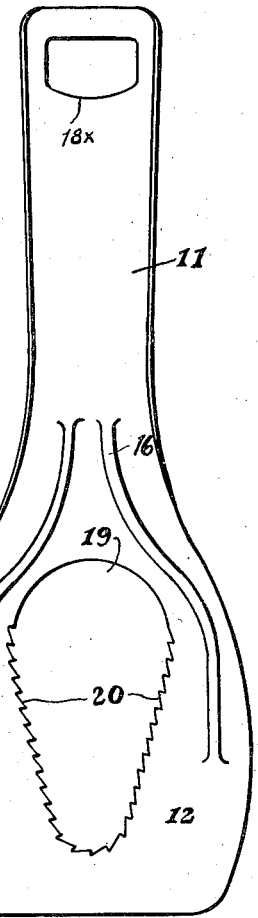
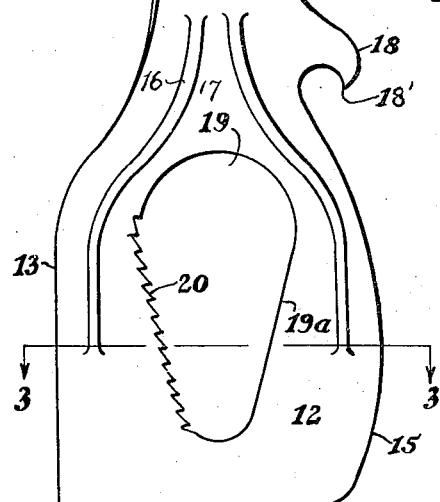
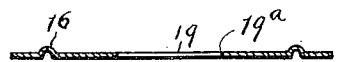
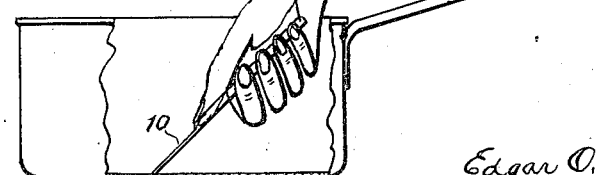
INVENTOR
Edgar O. Loeber
BY Geo. B. Pitts
ATTORNEY July 7, 1936.   E. O. LOEBER   2,046,334
UTENSIL
Filed Feb. 25, 1933   2 Sheets-Sheet 2

INVENTOR
Edgar O. Loeber.
BY Geo. A. Pitts
ATTORNEY

Patented July 7, 1936

2,046,334

UNITED STATES PATENT OFFICE 2,046,334

UTENSIL

Edgar O. Loeber, Lakewood, Ohio, assignor, by mesne assignments, to The Stay-On Mfg. Company, Cleveland, Ohio, a corporation of Ohio Application February 25, 1933, Serial No. 658,640

2 Claims. (Cl. 15—236)

This invention relates to a combination kitchen utensil, tool or device particularly adapted for household use and capable of facilitating a plurality of different operations. For example, it may be used to advantage in scraping drain boards and dough kneading boards; also, the side and bottom walls of pans and cooking utensils, where food cooked therein and residue therefrom adheres to and forms a coating on these walls. Devices heretofore in use, of which I have knowledge, have required undue manual exertion and repeated rubbing with soap or other materials to remove the adhering coat. The device may also be used for loosening or tightening screw caps and closures for bottles and jars, particularly where these parts have become rusted or otherwise sealed in position, and for removing crimped-on bottle caps and other forms of sealing elements.

One object of the invention therefore is to provide a utensil or device of this character shaped to provide a plurality of scraping edges and so constructed that scraping operations may be readily effected without undue physical effort.

Another object of the invention is to provide a unitary member of relatively simple and economical construction having walls or portions shaped or correlated to (a) provide for a multiplicity of uses or operations, each of which may be conveniently effected without undue exertion and (b) permit ready cleaning of the device.

Another object of the invention is to provide a combination kitchen utensil formed from a single section of sheet metal forming a handle and an operating portion having cap engaging means and a plurality of differently shaped scrapers, whereby different operations may be readily and conveniently carried out.

Another object of the invention is to provide a combination kitchen utensil formed from a single section of sheet metal having a plurality of operating walls and edges so arranged that the section may be adequately reinforced to insure durability and operating effectiveness.

Other objects of the invention will be apparent to those skilled in the art to which my invention relates from the following description taken in connection with the accompanying drawings, wherein Fig. 1 is a plan view of a tool embodying my invention.

Fig. 1a is a view, with parts broken away, showing one operation for which the tool is adapted.

Figs. 2 and 3 are sections on the lines 2—2 and 3—3, respectively, of Fig. 1.

Fig. 4 is a plan view similar to Fig. 1, but showing a slightly different form of construction.

Fig. 4a is a fragmentary plan view similar to Fig. 1, but showing another form of construction.

Figure 6:
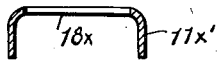
Fig. 6 is a section on the line 6—6 of Fig. 5.

Referring to Figs. 1, 2, and 3, 10 indicates a section of sheet metal having a handle portion 11 and a blade or operating portion 12. The marginal edge portions of the handle portion 11 are preferably curved on longitudinal lines to reinforce the handle and to provide a substantially rounded or U-shaped gripping surface. The curved marginal edges may be extended along a portion of the blade, toward its outer end for reinforcement purposes if desired. The blade portion 12 is preferably flat throughout its entire area to provide unobstructed faces on its opposite sides. The blade portion 12 is shaped to provide a straight side edge 13, a straight end edge 14 (preferably disposed at right angles to the edge 13) and a curved side edge 15. The edge 14 is adapted to scrape plane surfaces or walls, for example, the bottoms of pans or dishes and boards in cleaning the same; the edge 13 is adapted to scrape up-standing straight walls, for example, the side walls of pans or dishes where these sides are straight; and the edge 15 is adapted to scrape curved walls, for example, the side walls of dishes and pans that are of curvilinear shape. The edge 14 and one side edge 13 or 15 may be used substantially simultaneously. By forming the device of relatively thin sheet metal, the scraping edges are relatively sharp. As the section of metal is stamped out by a suitable die and the scraping edges are flat from end to end, each die cut edge will effectively engage materials and residue adhering to the surfaces to be cleaned and scraped. The blade portion 12 being flat, it may be used for various other purposes, for example, for turning and lifting eggs and cakes and stirring food while being prepared or cooked.

The connecting section between the handle portion and blade portion is flat, as shown at 17, to provide a surface for the user's thumb, so that pressure may be readily applied on the blade when the latter is operated.

18 indicates a lateral extension on one side of the device between the handle portion 11 and blade portion 12. The edges of the extension are preferably curved eccentrically and terminate in an inturned pointed end 18' spaced from the adjacent side edge of the blade, for example, the edge 15 and arranged to co-operate therewith when said edge and point engage a cap on a bottle or jar to remove the cap therefrom.

The blade portion 12 is formed centrally with an elongated opening 19 the sides 19a of which converge. In the forms shown in Figs. 1, 4 and 4a, the sides 19a converge toward the scraping edge 14. In Figs. 1 and 4a, one side 19a is provided with serrations 20 having relatively sharp terminating points. The opening 19 permits the blade to be positioned over a nut or a threaded-on bottle cap and moved endwise to engage the nut or cap between the serrations 20 and the opposite side 19a, whereby the nut or cap may be tightened or loosened. In Fig. 1 the serrations are shown as having active points arranged to resist turning in one direction only, so that one face of the blade is up when the operation requires the device to be turned or swung in one direction and when the operation requires the device to be turned or swung in the opposite direction the blade is reversed. The opening 19 may serve to engage a hook and hang thereon when the tool is not in use; the outer end of the handle may be provided with an opening 11x for the same purpose.

Fig. 4 shows a slightly different form of construction. In this form the outer end wall of the opening 19 and both sides thereof are provided with serrations 20. Where the active edges or points of the serrations resist turning in one direction only, those on one side are oppositely disposed to those on the opposite side, so that both series of serrations will be effective when engaging the opposite sides of a nut or cap. Also, the extension 18 is omitted, but the end portion of the handle 11 is formed with an enlarged opening 18x, elongated transversely, the outer and inner edges of which may engage the top and rim of a bottle cap to remove it. The opening 18x may also be used to engage a nail or hook for hanging the tool up when not in use. By providing converging sides for the opening 19, they may engage closures having varying diameters. The free end of the handle portion and the edge 14 may be used for engaging the kerf in the head of a screw, whereby the latter may be turned.

Figure 5:
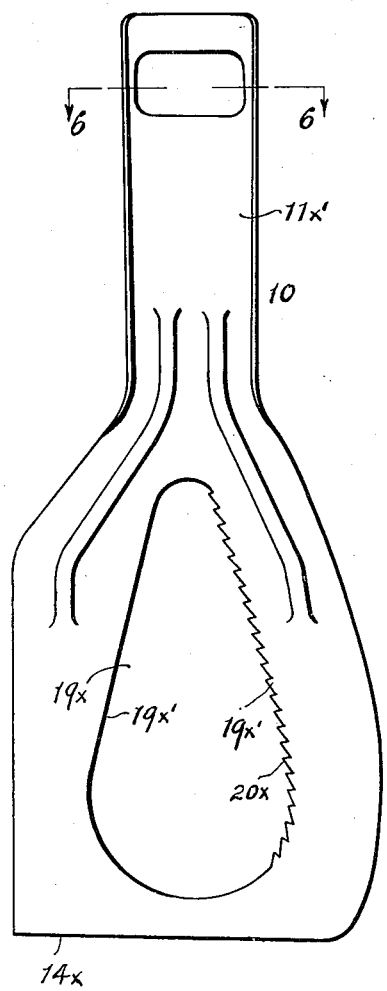
Fig. 5 is a plan view of another form of construction embodying the invention.

Fig. 5 shows a construction substantially similar to Fig. 1. In this form of construction, the opening 19x is elongated longitudinally of the device 10, but the enlarged portion of the opening is adjacent the operating edge 14x and the sides 19x' converge toward the handle 11x'. In this arrangement pressure between the serrations 20x and the opposed, co-operating wall 19x' and the walls of the cap to be operated upon, is exerted outwardly or away from the user.

In the forms of construction so far described, the serrations may be suitably hardened to insure adequate gripping of the element to be loosened or tightened and durability.

Figure 7:
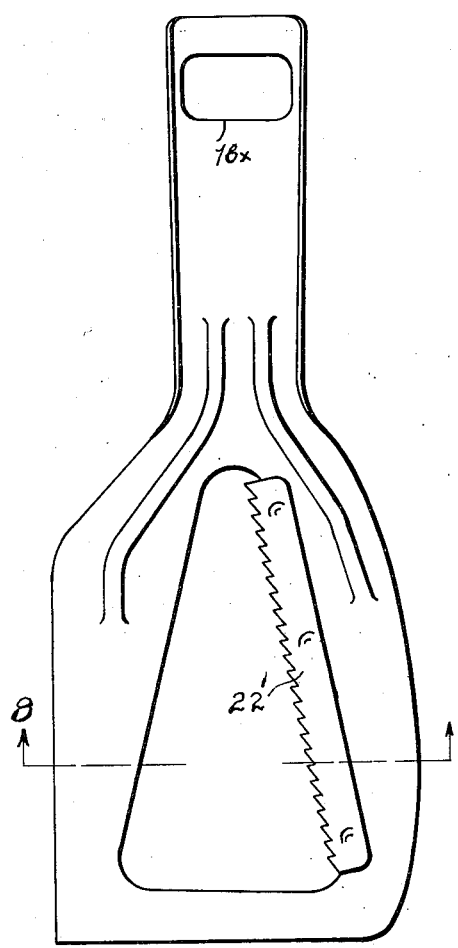
Fig. 7 is a view similar to Fig. 5, but showing a slight modification.
Figure 8:
Fig. 8 is a section on the line 8—8 of Fig. 7.

When desired, the serrations may be provided on a separate section of hardened metal 22', as shown in Fig. 7, and the latter suitably secured, as by spot welding, in position on one face of the blade portion. In this form of construction, the marginal portion of the adjacent converging wall may be off-set at 23 to form a seat for the metal section 22 to position the latter in the plane of the opposed, cooperating converging wall.

The section of metal may be reinforced by pressed-up ribs 16 which extend from the central portion of the blade upwardly into the handle. In my construction it will be noted that the opening 19 is arranged centrally of the blade portion and elongated longitudinally of the device. This provides ample room for the reinforcements 16, when the latter are found to be desirable to strengthen the device intermediate its ends.

It will be noted that my unitary utensil is formed from a single section of sheet metal and that all portions thereof are unobstructed or devoid of shoulders and pockets, so that it lends itself to easy cleaning; also, that the utensil is straight from end to end which permits it to be stored in a drawer or hung up without occupying undue space.

To those skilled in the art to which my invention relates, many changes in construction and widely differing embodiments and applications of the invention will suggest themselves without departing from the spirit and scope of the invention. My disclosures herein are purely illustrative and are not intended to be in any sense limiting.

What I claim is:

1. A device as set forth comprising a flat blade provided with a scraping edge, a channelled handle integral with the blade, and a pair of spaced apart ribs extending from a point upwardly of the lower end of the handle to a point spaced upwardly of the scraping edge of the blade, said blade having an opening therethrough between the ribs and closely adjacent the scraping edge.

2. A device as set forth comprising a flat blade provided with a scraping edge, a channelled handle integral with the blade, and a pair of spaced apart longitudinally extending ribs disposed inwardly of the opposite edges of the handle and the blade and extending from a point upwardly of the lower end of the handle to a point spaced upwardly of the scraping edge of the blade, said blade having an opening therethrough between the ribs and closely adjacent the scraping edge.

EDGAR O. LOEBER.